May 11, 1954 E. M. STROHLEIN ET AL 2,678,344
STORAGE BATTERY FILLING AND VENTING DEVICE
Filed March 31, 1951 2 Sheets-Sheet 1

INVENTORS
ELMER M. STROHLEIN
WILLIAM W. ALBERT
BY
*Edward J. Dwyer*
ATTORNEY

May 11, 1954 E. M. STROHLEIN ET AL 2,678,344
STORAGE BATTERY FILLING AND VENTING DEVICE
Filed March 31, 1951 2 Sheets-Sheet 2
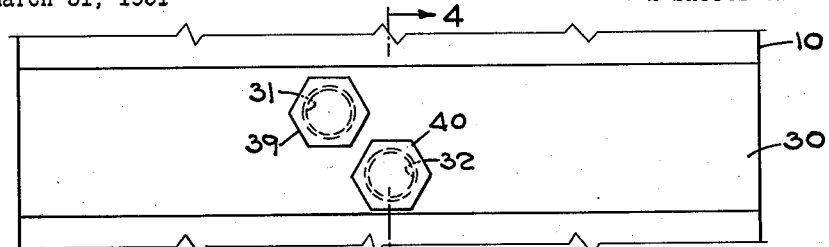
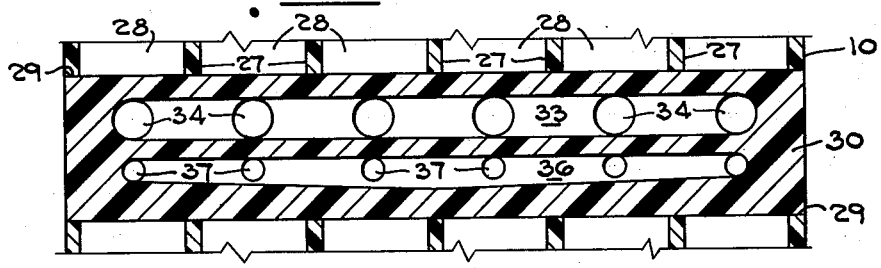
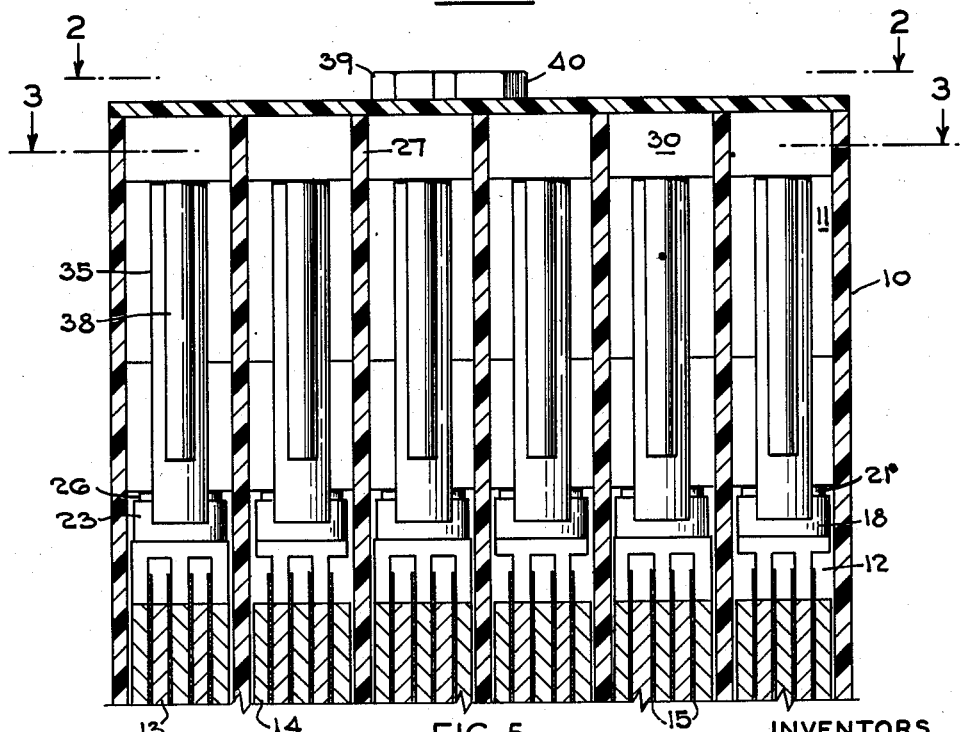
INVENTORS
ELMER M. STROHLEIN
WILLIAM W. ALBERT
BY
ATTORNEY Patented May 11, 1954

2,678,344

UNITED STATES PATENT OFFICE 2,678,344

STORAGE BATTERY FILLING AND VENTING DEVICE

Elmer M. Strohlein, Philadelphia, Pa., and William W. Albert, Trenton, N. J., assignors to The Electric Storage Battery Company, a corporation of New Jersey Application March 31, 1951, Serial No. 218,610

4 Claims. (Cl. 136—162)

The invention relates to improvements in storage battery filling and venting devices and, more particularly, to that type of filling and venting device that is effective to control the level of the electrolyte within the cells of a storage battery.

It is among the objects of the invention to provide a new and improved filling and venting device which is simple in construction, can be used to fill simultaneously all cells of a storage battery, and gives a clear and positive indication when the desired electrolyte level has been reached.

In the drawing, wherein like numerals are used to designate like parts,

Figure 2 is a plan view taken along the line 2—2 of Figure 5.

Figure 3 is a view taken along the line 3—3 of Figure 5.

Figure 5 is a sectional view taken along the line 5—5 of Figure 1.

Figure 1:
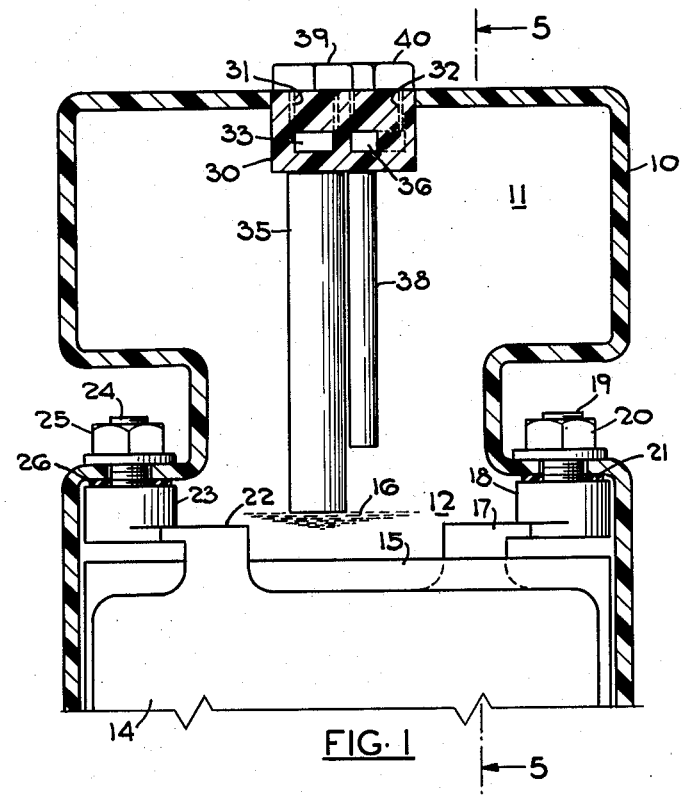
Figure 1 is an elevational view partially in cross section showing the improved filling and venting device in operative position in a storage battery.
Figure 4:
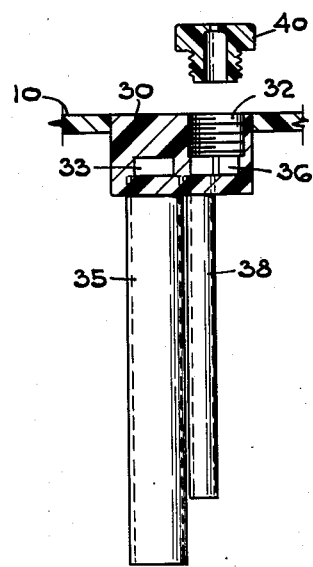
Figure 4 is a sectional view taken along the line 4—4 of Figure 2.

Referring now to the drawing, particularly Figures 1 and 2, there is shown a storage battery container designated generally by the numeral 10. Container 10 is here represented to be of the non-spill, double chamber type i. e., one having an upper chamber 11 of sufficient capacity to receive the electrolyte in case the battery is inverted, and venting means which will remain operative to permit the escape of gases during the period of inversion, said venting means being so positioned that electrolyte cannot escape therethrough regardless of the position of the battery. These two features do not form part of the present invention and are disclosed in U. S. Patent No. 2,472,852 granted to Lester E. Lighton on June 14, 1949, and assigned to the assignee of the present application. It should be pointed out, however, that the filling and venting device herein described and claimed is equally valuable for any type of wet storage battery whether or not the non-spill feature is included.

Within lower chamber 12 of container 10 is a conventional storage battery element comprising positive plates 13, negative plates 14, and separators 15, the entire element being surrounded by electrolyte 16. A strap 17 connects positive plates 13 to terminal post 18, from which terminal stud 19 extends through the wall of container 10 and is secured externally by terminal nut 20. Stud 19, which may be constructed of copper to provide better conductivity, is preferably surrounded between post 18 and container 10 by gasket 21 to provide a seal and prevent electrolytic corrosion.

In a similar manner, the negative plate group is provided with strap 22, terminal post 23, terminal stud 24, terminal nut 25, and gasket 26.

As shown to best advantage in Figures 3 and 5, container 10 is molded, or otherwise fabricated, with a number of partitions, such as shown at 27, dividing the interior of the container into any desired number of completely segregated compartments 28, each adapted to receive one of the hereinbefore described elements, and house a storage battery cell. Partitions 27, as well as the end walls of container 10 are recessed as at 29 to receive and support cover member 30, such member then being sealed to the container 10 and partitions 27, as by a suitable cement.

The upper portion of cover member 30 is provided with a first opening 31 which permits venting during the filling operation when the level of electrolyte 16 is below normal, and a second opening 32 through which electrolyte or water can be supplied to the cells when desired, and which permits venting of gases evolved within the cells during operation of the battery when the electrolyte level is normal or above. For purposes of identification, opening 31 will hereinafter be referred to as the venting opening and opening 32 will be termed the filling opening.

Communicating with the lower end of venting opening 31 is a venting manifold 33 formed lengthwise of cover member 30 and having a plurality of apertures 34 extending from venting manifold 33 to the bottom of cover member 30, one aperture being provided for each of the compartments 28. Venting tubes 35 are either attached to, or molded integrally with, cover member 30 so that the tube openings correspond with apertures 34, the tubes being so constructed and arranged that the lower ends thereof extend downwardly into compartments 28 to the normal or desirable level of electrolyte 16. As shown in Figure 5, one of the venting tubes and its corresponding aperture are directly beneath venting opening 31 to permit insertion of a hydrometer to obtain an indication of the specific gravity of the electrolyte.

Communicating with the lower end of filling opening 32 is a filling manifold 36 provided with a plurality of filling apertures 37 formed in a similar fashion to apertures 34. Filling tubes 38, similar to venting tubes 35 but of relatively smaller cross-section, correspond with each filling aperture and extend downwardly into each compartment 28, the lower end of each such tube being at a point above the lower ends of tubes 35. The length of tubes 38 is so measured that they will remain above the electrolyte level regardless of the position to which the battery may be turned. Filling opening 32 is so placed in cover member 30 as to be offset from filling apertures 37 in order that there will be no communication between said opening and any of said apertures except by way of filling manifold 36.

From the above set forth description, the operation of the device will be readily apparent. When it is desired to fill the cells, or to add liquid to bring the electrolyte up to the desired level, filling opening 32 is utilized. The size of such opening is so gauged that filling manifold 36 will be kept full of liquid at all times during the filling process. Additionally, filling manifold 36 is so proportioned as to be of sufficient size that the liquid passing therethrough will at all times form a liquid seal in each of the filling ducts 38. To achieve this, the cross sectional area of the filling manifold must, at any given point, exceed the total cross sectional area of those filling ducts between said point and the end wall of the battery. Additionally it has been found desirable to taper the cross sectional area of the filling manifold gradually and continually from the largest dimension which is directly under the filling opening to the outer ends of the manifold, at which latter point the area of said manifold is only slightly larger than the cross sectional area of one of the filling tubes.

By such a construction all cells receive liquid simultaneously to permit complete filling of the entire battery in the shortest possible period of time, and a head of liquid is maintained that will enable the device to limit the electrolyte level at the desired predetermined point and to give a positive indication when said desired point has been reached.

As liquid passes downwardly through filling tubes 38, the electrolyte level rises within each cell and air is expelled through venting tubes 35, venting manifold 33, and venting opening 31. When the liquid reaches the bottom of venting tubes 35, said tubes are sealed off and addition of further liquid to the cell compresses the air within the cell, the head of electrolyte present within filling tubes 38, filling manifold 36, and filling opening 32 being sufficient to prevent the escape of air by that path. As the filling operation continues, the air is further compressed thereby forcing liquid upwardly through venting tubes 35 into the venting manifold 33 and venting opening 31, thus giving a positive indication that the cells are properly filled.

Such indication having been given, it is immediately apparent that no further liquid should be added and the filling operation is halted. Any liquid remaining in venting tubes 35, and venting manifold 33, and in filling tubes 38, filling manifold 36, and filling opening 32 flows downwardly into the cell and adjusts the electrolyte level to a point between the lower ends of tubes 35 and 38. Venting opening 31 is then closed by seal plug 39, and a perforated plug 40 is inserted into filling opening 32 to permit passage through filling tubes 38, filling manifold 36, and filling opening 32 of gases evolved during operation of the battery.

It will thus be seen that there has been provided a new and improved filling device for storage batteries which facilitates the filling thereof by adding liquid to each cell simultaneously and gives a positive and clear indication when the proper electrolyte level has been reached.

Obviously, certain refinements and modifications will be apparent to those skilled in the art. It is, therefore, intended that the invention shall not be limited by the specific examples set forth but only by the scope of the appended claims.

We claim:

1. Means for filling and controlling the electrolyte level simultaneously within a plurality of storage battery cells comprising, a cover having a filling opening and a venting opening, a venting duct extending downwardly from the cover to the normal electrolyte level in each cell, a vent manifold connecting said venting ducts with said venting opening, a filling duct associated with each venting duct and extending downwardly from the cover to a point above the lower end of said venting duct, and a filling manifold connecting said filling ducts to said filling opening.

2. The filling and level controlling means of claim 1 wherein the venting opening is closed with a seal plug and the filling opening is provided with a perforated plug whereby venting of gases evolved during normal operation of the battery will occur solely through the filling opening.

3. Means for filling and controlling the electrolyte level simultaneously within a plurality of storage battery cells comprising, a cover having a filling opening and a venting opening, a venting duct extending downwardly from the cover to the normal electrolyte level in each cell, a vent manifold connecting said venting ducts with said venting opening, a filling duct associated with each venting duct and extending downwardly from the cover to a point above the lower end of said venting duct, and a filling manifold connecting said filling ducts to said filling opening, the cross sectional area of said filling manifold being greater than the total cross sectional area of said filling tubes and the cross sectional area of said filling opening being greater than that of said filling manifold.

4. The filling and level controlling means of claim 3 in which the filling opening is centrally located in the cover, the filling ducts are laterally offset on each side thereof, and the cross sectional area of the filling manifold tapers from the center outwardly to an area slightly larger than that of one of the filling ducts.

References Cited in the file of this patent

UNITED STATES PATENTS

| Number | Name | Date |
|---|---|---|
| 1,471,048 | Menger | Oct. 16, 1923 |
| 1,848,035 | Van Meter | Mar. 1, 1932 |
| 1,878,223 | Woodbridge | Sept. 20, 1932 |
| 1,993,006 | Hermanns | Mar. 5, 1935 |
| 1,996,843 | Van Meter | Apr. 9, 1935 |
| 2,021,288 | Carlile | Nov. 19, 1935 |
| 2,141,621 | Setzer | Dec. 27, 1938 |
| 2,302,719 | Sandusky | Nov. 24, 1942 |
| 2,505,207 | Riggs | Apr. 25, 1950 |

FOREIGN PATENTS

| Number | Country | Date |
|---|---|---|
| 272,013 | Great Britain | June 9, 1927 |
| 322,048 | Great Britain | Nov. 28, 1929 |